(12) United States Patent
Wu et al.

(10) Patent No.: US 9,547,141 B2
(45) Date of Patent: Jan. 17, 2017

(54) CONNECTOR FOR RECEIVING PLUG AND CONNECTOR ASSEMBLY HAVING SANDWICHED HEAT CONDUCTION

(71) Applicants: Tyco Electronics (Shanghai) Co. Ltd., Shanghai (CN); Tyco Electronics Corporation, Berwyn, PA (US)

(72) Inventors: Honghao Wu, Shanghai (CN); Zhaohai Xue, Shanghai (CN); Eric David Briant, Berwyn, PA (US); David Bruce Sarraf, Berwyn, PA (US); Lucas A. Benson, Berwyn, PA (US); Jian Lu, Shanghai (CN)

(73) Assignees: Tyco Electronics (Shanghai) Co. Ltd., Shanghai (CN); Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/836,626

(22) Filed: Aug. 26, 2015

(65) Prior Publication Data
US 2016/0062065 A1    Mar. 3, 2016

(30) Foreign Application Priority Data
Aug. 27, 2014 (CN) .......................... 2014 1 0427247

(51) Int. Cl.
*G02B 6/42* (2006.01)
(52) U.S. Cl.
CPC ........... *G02B 6/4269* (2013.01); *G02B 6/4277* (2013.01); *G02B 6/4284* (2013.01)

(58) Field of Classification Search
CPC ....... G02B 6/4269; G02B 6/42; G02B 6/4277; G02B 6/4284
See application file for complete search history.

(56) References Cited

U.S. PATENT DOCUMENTS

| | | | |
|---|---|---|---|
| 6,558,191 B2 * | 5/2003 | Bright | G02B 6/4246 439/541.5 |
| 7,037,136 B1 * | 5/2006 | Korsunsky | H01R 13/5213 174/16.1 |
| 7,562,696 B2 * | 7/2009 | Lin | F28D 15/0266 165/104.21 |
| 8,382,509 B2 * | 2/2013 | David | H01R 13/6471 439/331 |
| 9,137,929 B1 * | 9/2015 | Yang | H01R 12/724 |
| 9,192,043 B2 * | 11/2015 | Farner | H05K 1/0209 |
| 9,391,407 B1 * | 7/2016 | Bucher | G02B 6/4201 |
| 2003/0155104 A1 * | 8/2003 | Wenger | F28D 15/0233 165/80.3 |
| 2003/0183373 A1 * | 10/2003 | Sarraf | F28D 15/02 165/104.33 |

(Continued)

*Primary Examiner* — Andrew Jordan
(74) *Attorney, Agent, or Firm* — Barley Snyder

(57) ABSTRACT

A connector is provided and includes a cage, a plurality of partition devices, and a heat dissipation device. The cage includes a plurality of plug receiving units that are arranged in at least a two columns by two rows arrangement. The plurality of partition devices include an upper partition plate and a lower partition plate and is positioned between two adjacent plug receiving units of the plurality of plug receiving units. The heat dissipation device includes a heat conduction block positioned between the upper partition plate and the lower partition plate, and a heat conduction pipe that contacts the heat conduction block and extends beyond a rear wall of the cage.

25 Claims, 15 Drawing Sheets

(56) References Cited

U.S. PATENT DOCUMENTS

| | | | | |
|---|---|---|---|---|
| 2004/0112570 | A1* | 6/2004 | Wenger | F28D 15/0233 |
| | | | | 165/80.3 |
| 2007/0081344 | A1* | 4/2007 | Cappaert | G02B 6/0085 |
| | | | | 362/373 |
| 2011/0306253 | A1* | 12/2011 | Kumamoto | H01R 12/7064 |
| | | | | 439/892 |
| 2012/0052720 | A1* | 3/2012 | David | H01R 13/6595 |
| | | | | 439/487 |
| 2012/0274876 | A1* | 11/2012 | Cappaert | G02B 6/0085 |
| | | | | 349/62 |
| 2013/0308898 | A1* | 11/2013 | Doerr | G02B 6/428 |
| | | | | 385/14 |
| 2014/0202755 | A1* | 7/2014 | Ito | H05K 9/0018 |
| | | | | 174/359 |
| 2014/0241673 | A1* | 8/2014 | Chan | G02B 6/4268 |
| | | | | 385/92 |
| 2014/0328036 | A1* | 11/2014 | Sarraf | H05K 1/092 |
| | | | | 361/760 |
| 2015/0087180 | A1* | 3/2015 | Wu | G02B 6/4269 |
| | | | | 439/485 |
| 2015/0171558 | A1* | 6/2015 | Yu | H01R 12/58 |
| | | | | 439/607.01 |
| 2015/0180168 | A1* | 6/2015 | Han | H01R 13/506 |
| | | | | 439/353 |
| 2015/0214686 | A1* | 7/2015 | Khazen | H01R 13/65802 |
| | | | | 29/453 |

\* cited by examiner

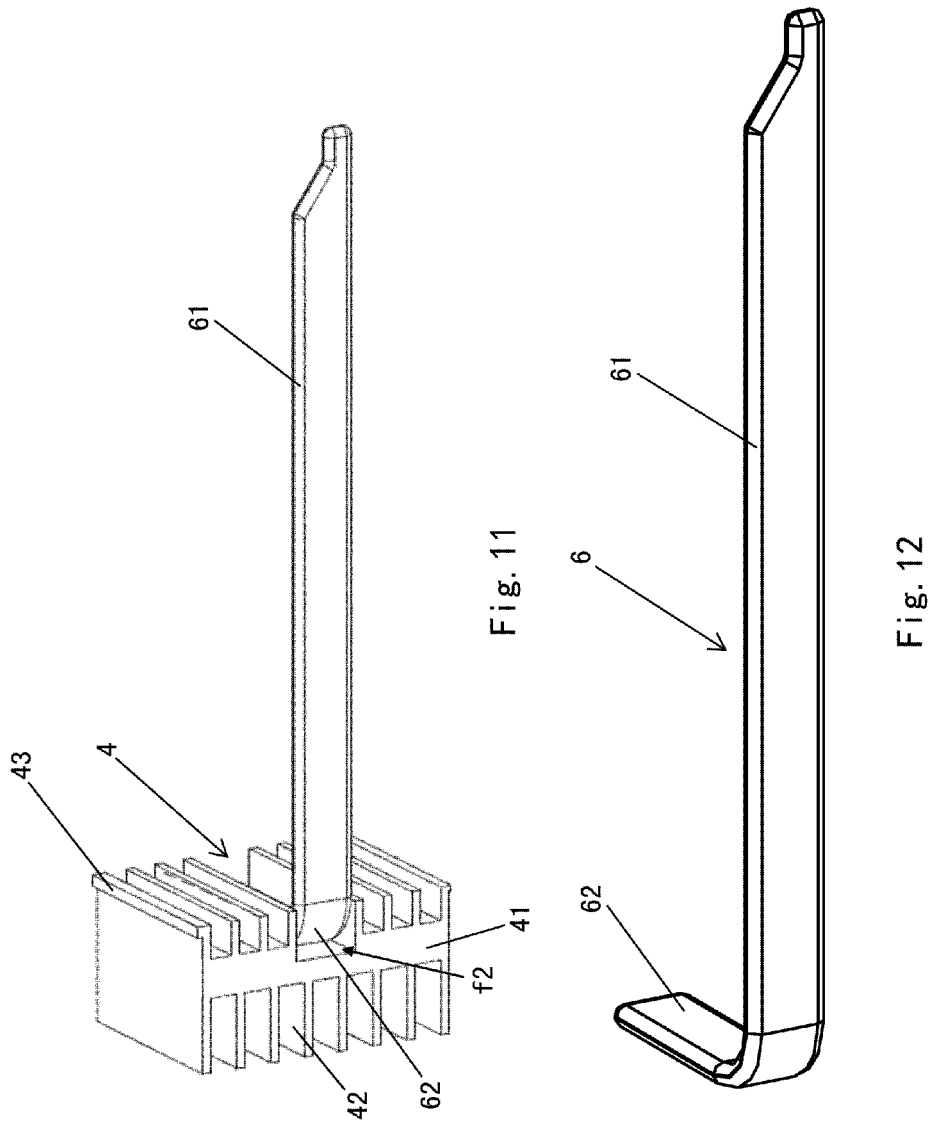

CONNECTOR FOR RECEIVING PLUG AND CONNECTOR ASSEMBLY HAVING SANDWICHED HEAT CONDUCTION

CROSS-REFERENCE TO RELATED APPLICATION

This application claims the benefit of the filing date under 35 U.S.C. §119(a)-(d) of Chinese Patent Application No. 201410427247.1 filed on Aug. 27, 2014.

FIELD OF THE INVENTION

The invention relates to a connector and, more particularly, to a connector for receiving a plug with improved heat dissipation performance.

BACKGROUND

A known small Form Factor (SFF) connector assembly with a photoelectric conversion function generally includes a plug, a receptacle mated with the plug, and a connector for receiving the plug and the receptacle. The plug is used as an optoelectronic module having a photoelectric chip for converting an optical signal from an external optical fiber to an electrical signal. The receptacle is mounted in the connector and connects with the plug inserted into the connector. In the plug, a photoelectric chip is mounted in a protection case thereof. The photoelectric chips generate heat during use, increasing the temperature of the photoelectric chips and deteriorating the photoelectric conversion performance of the photoelectric chips.

SUMMARY

The present invention has been made to overcome or alleviate at least one aspect of the above mentioned disadvantages, among other. Accordingly, a connector is provided and includes a cage, a plurality of partition devices, and a heat dissipation device. The cage includes a plurality of plug receiving units that are arranged in at least a two columns by two rows arrangement. The plurality of partition devices include an upper partition plate and a lower partition plate and is positioned between two adjacent plug receiving units of the plurality of plug receiving units. The heat dissipation device includes a heat conduction block positioned between the upper partition plate and the lower partition plate, and a heat conduction pipe that contacts the heat conduction block and extends beyond a rear wall of the cage.

BRIEF DESCRIPTION OF THE DRAWINGS

The above and other features of the present invention will become more apparent by describing in detail exemplary embodiments thereof with reference to the accompanying drawings, in which:

FIG. 11 is a perspective view of a heat dissipation device of the connector assembly according to the invention;

FIG. 12 is a perspective view of a heat conduction pipe of the connector assembly according to the invention;

DETAILED DESCRIPTION OF THE EMBODIMENT(S)

Figure 1:
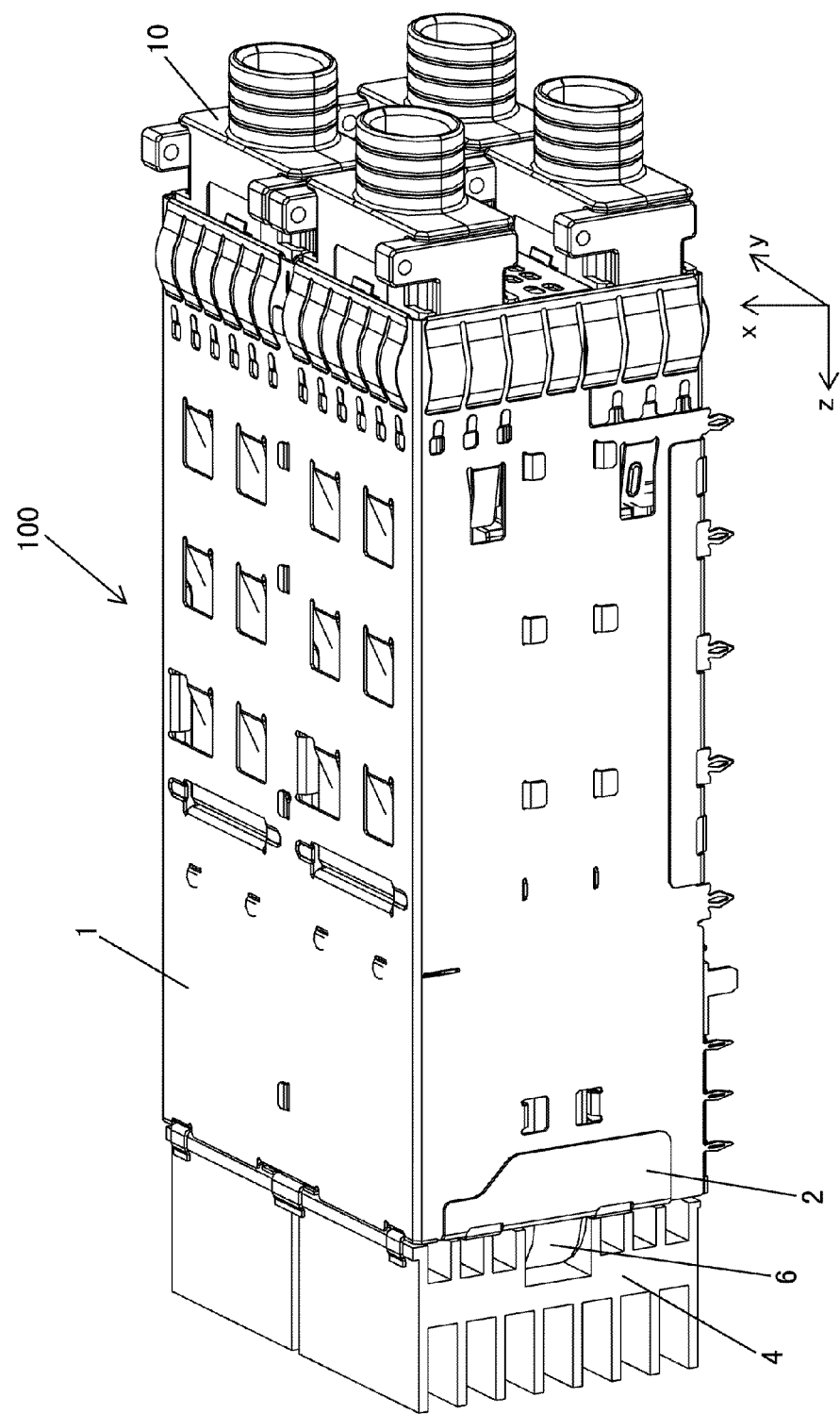
FIG. 1 is a top perspective view of a connector assembly according to the invention.
Figure 2:
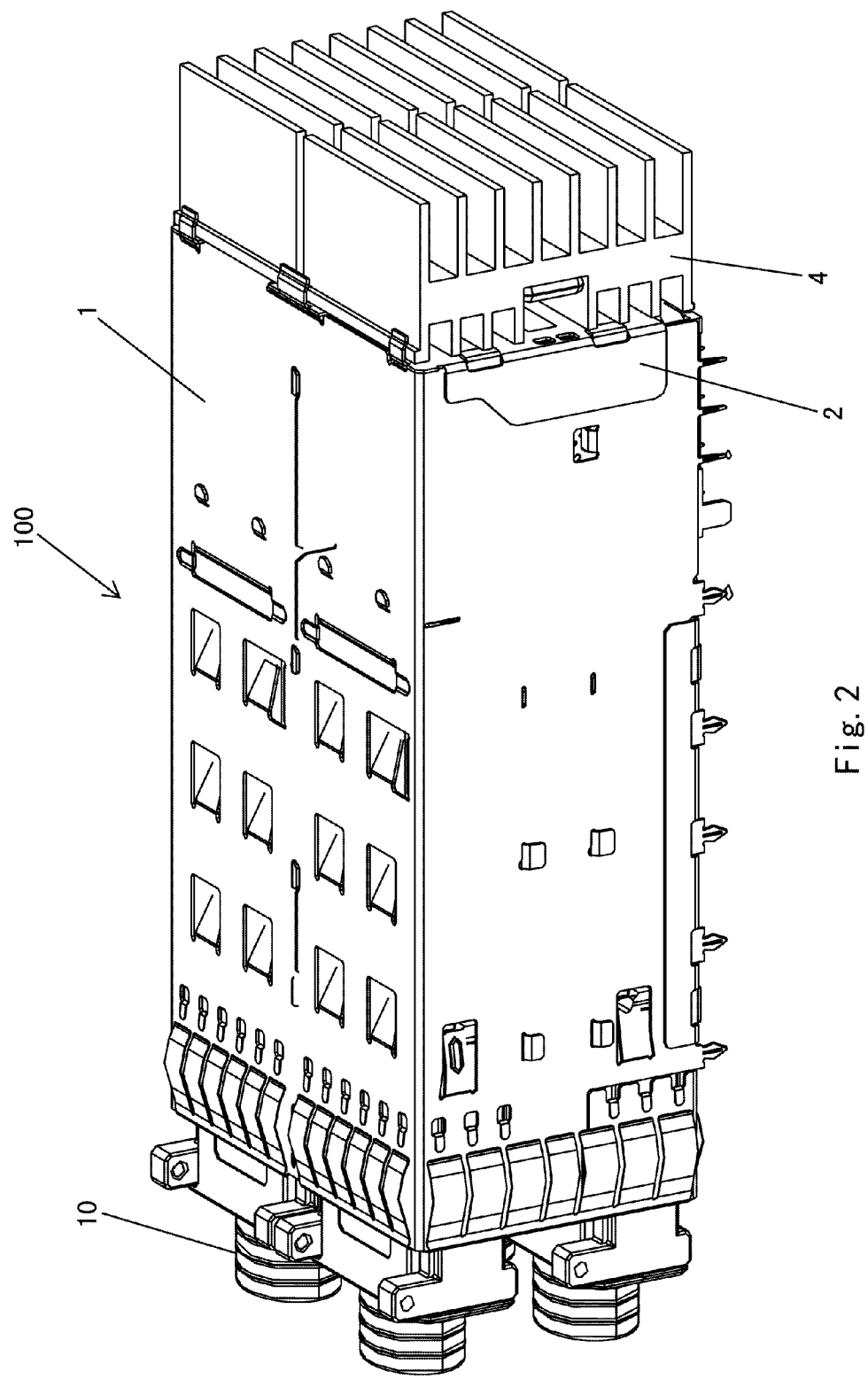
FIG. 2 is a bottom perspective view of the connector assembly of FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIGS. 1-5, a connector assembly 100 according to the invention is shown and includes a connector 200.

Figure 13:
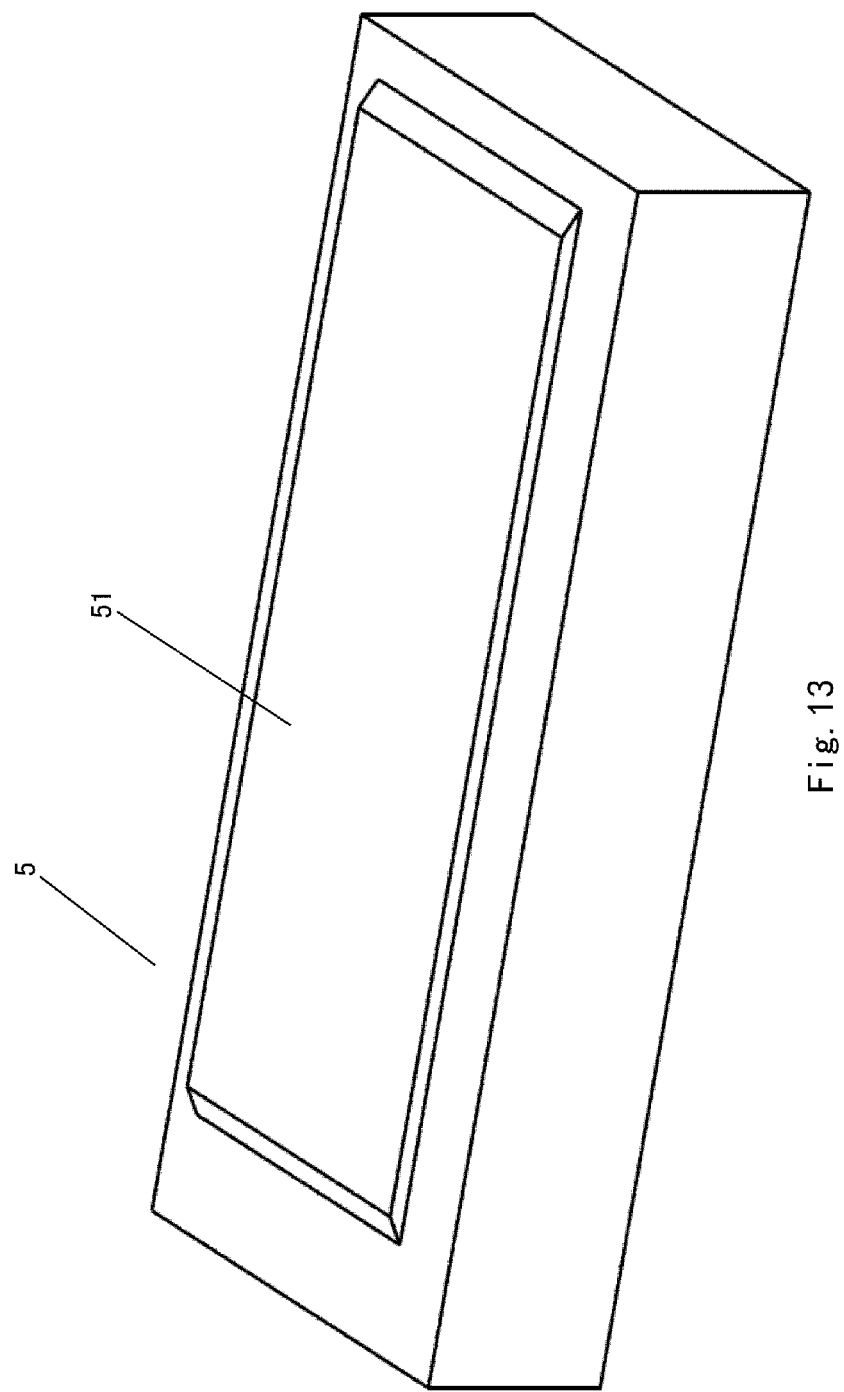
FIG. 13 is a perspective view of a heat conduction block of the connector assembly according to the invention.

As shown in FIGS. 1-3 and 5, the connector 200 receives a plug 10 therein. The connector 200 includes a cage 1 made of, for example, stainless steel or the like, a plurality of partition devices 3 made of, for example, stainless steel or the like, and a plurality of heat dissipation devices. The cage 1 includes a plurality of plug receiving units 11, for receiving the plurality of plugs 10 therein, respectively, arranged in at least two columns in the height direction and at least two rows in the lateral direction. The plurality of partition devices 3 are provided between two adjacent plug receiving units 11 in the height direction and comprising an upper partition plate 31 and a lower partition plate 32. The plurality of heat dissipation devices include a heat conduction block 5 (see FIG. 13) and a heat conduction pipe 6. The heat conduction block 5 is sandwiched between the upper partition plate and the lower partition plate 31, 32 to absorb heat generated by the respective plug 10. The heat conduction pipe 6 keeps contact with the heat conduction block 5 and extends beyond a rear of the cage 1 to transfer heat absorbed from the heat conduction block 5 to the outside of the cage 1. Thereby, it can decrease the temperature of the plug 10 and ensure the stable electrical performance of the plug 10.

According to an exemplary embodiment of the invention, a connector assembly 100 is provide and includes the above connector 200 and at least one plug 10. The plugs 10 each is inserted into the respective plug receiving unit 11 of the connector 200, so as to electrically connect to a receptacle (not shown) provided in the connector. Each of the partition devices 3 of the connector can contact at least a portion of the respective plug 10.

In an exemplary embodiment, the plug 10 may include an optoelectronic module with a photoelectric conversion function.

In the shown embodiment, the number of the plugs 10 may be equal to or less than that of the plug receiving units 11 as necessary. The plugs 10 are provided in the plug receiving units 11, respectively. In the shown embodiment, each of the plugs 10 may include a photoelectric chip for converting an optical signal from an optical fiber (not shown) to an electrical signal. The heat dissipation device mounted in the partition device 3 is in contact with a protection case 101 of the plug 10, so that the heat generated by the plug 10 can be transferred to the outside of the cage 1.

Figure 3:
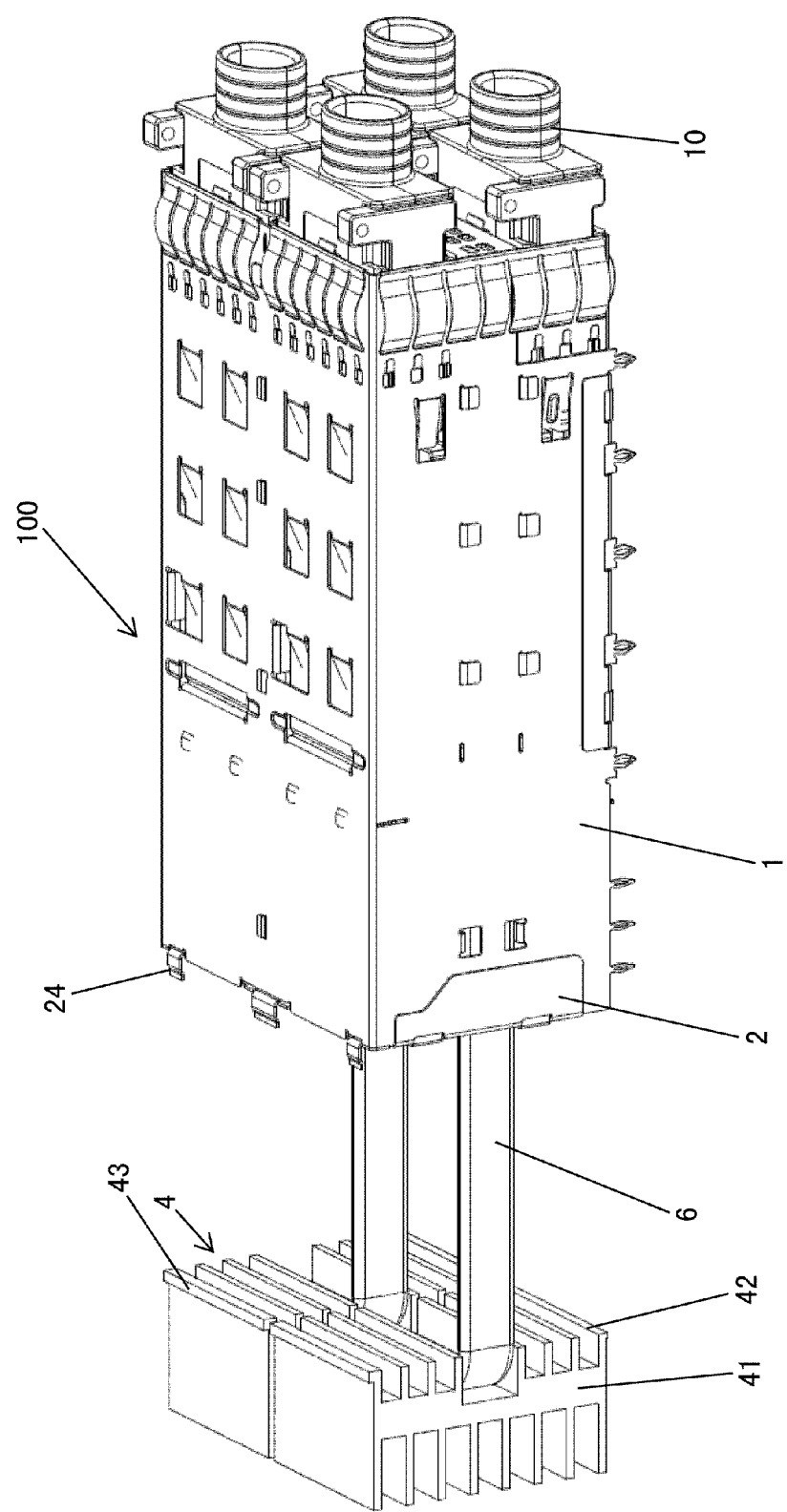
FIG. 3 is a top perspective view of the connector assembly of FIG. 1, wherein a heat dissipation device is removed from the connector assembly.
Figure 4:
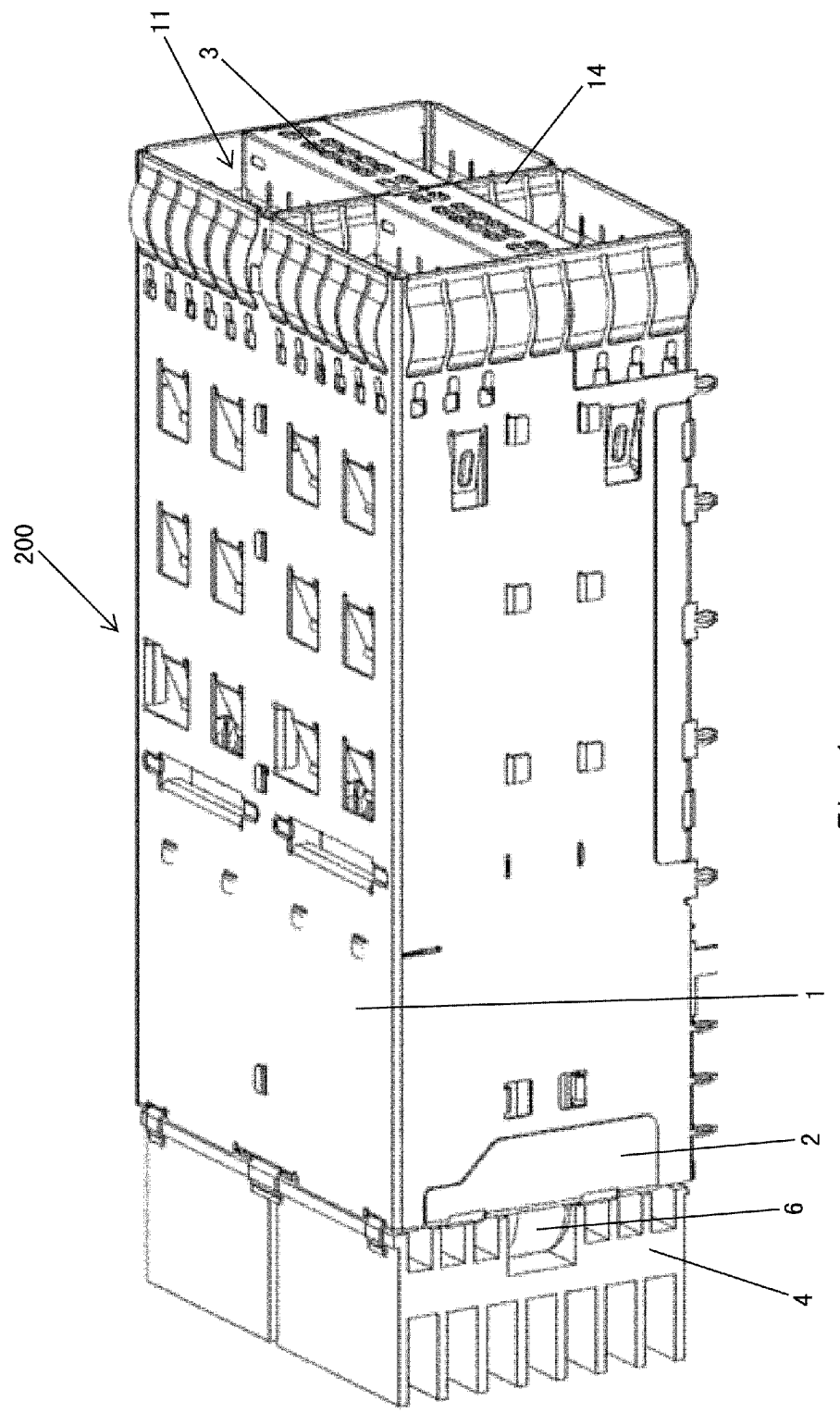
FIG. 4 is a perspective view of a connector of the connector assembly according to the invention.
Figure 5:
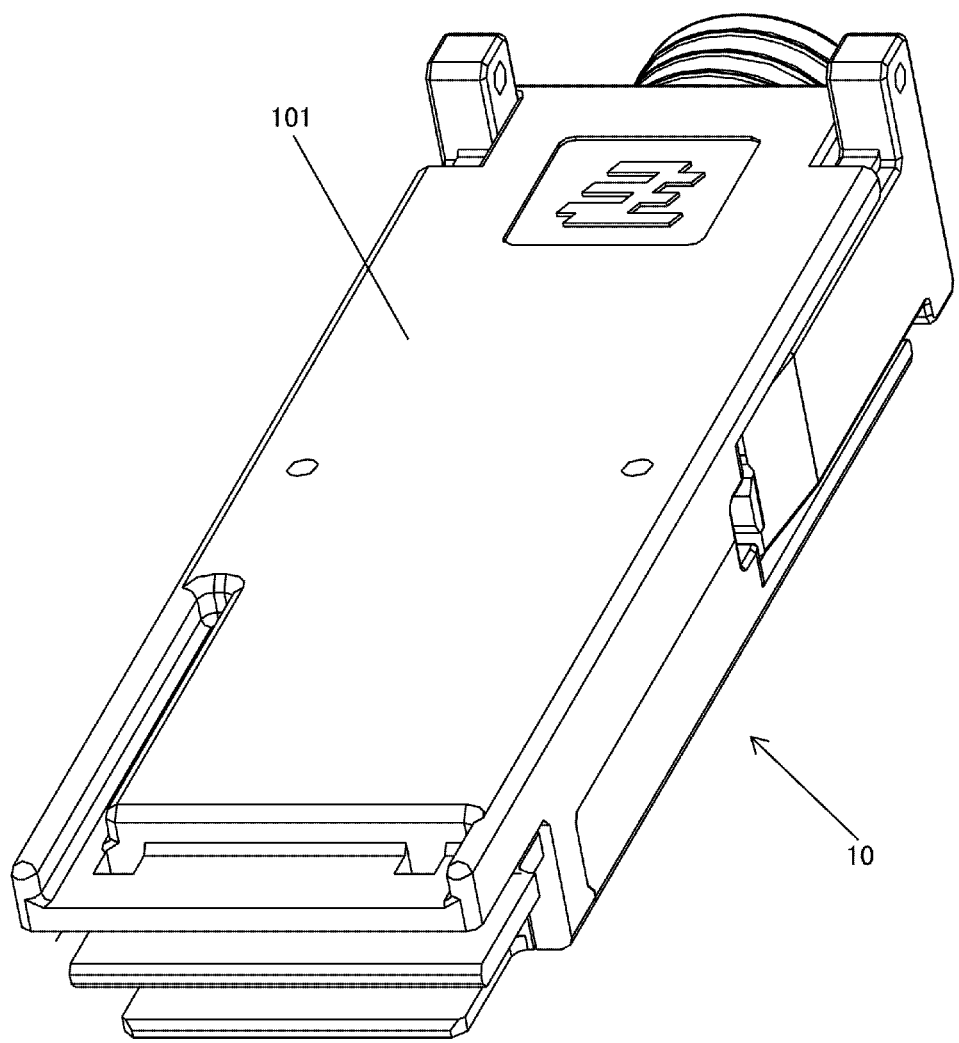
FIG. 5 is a perspective view of a plug of the connector assembly of FIG. 1.

As shown in FIGS. 3 and 4, the heat dissipation device further includes a radiator 4 mounted on the outside of the rear of the cage 1 and connected to the heat conduction pipe 6, so as to dissipate the heat transferred from the heat conduction pipe 6 as quickly as possible.

As shown in FIGS. 11 and 12, the heat conduction pipe 6 is configured to have a flat shaped cross section and come into contact with a side surface of the heat conduction block 5.

According to an exemplary embodiment of the invention, the heat conduction pipe 6 may be made of copper with a thermal conductivity of about 400 w/mk. Many capillary tubes, made of thermal superconductor with a thermal conductivity above 2000 w/mk, are formed in the heat conduction pipe, so as to improve the capacity of heat transmission of the entire heat conduction pipe. The heat conduction pipe is an ultrathin flat heat pipe with a thickness of about 1.5 mm-1.7 mm, a width of about 5.5 mm, and a total length of about 88 mm before bending. The flat heat pipe is bent by about 90 degrees in the thickness direction thereof to form a substantial L-shape.

As shown in FIGS. 11 and 12, in an exemplary embodiment, the radiator 4 includes a base 41 and a plurality of fins 42 integrally made of good thermal conductivity material. The plurality of fins 42 are provided on opposite surfaces of the base 41 and parallel to each other. The substantially L-shaped heat pipe includes a first arm 61 inserted into the cage 1 and coming into contact with the heat conduction block 5 and a second arm 62 integrally connected to the first arm 61 and mounted between adjacent fins 42 of the radiator 4. In another exemplary embodiment, a groove f2 is formed along a side of the radiator 4 near the heat conduction pipe 6, and the second arm 62 of the heat conduction pipe 6 is mounted in the groove f2. In an exemplary embodiment, solder paste may be provided in the groove f2. In this case, when the second arm 62 is placed in an oven, the solder paste is melt, and the heat conduction pipe 6 is soldered to the radiator 4.

As shown in FIGS. 4 and 7-10, the cage 1 may include an upper cage 12 and a lower cage 13 detachably assembled together. The upper cage 12 includes a top wall 121 and two side walls 125 formed by bending a metal sheet. Pins 123, for connecting to a support member, for example, a circuit board, and pegs 124, for connecting to the lower cage 13, are formed on a lower side edge of the side walls 125. The lower cage 13 includes a bottom wall 131 and two secondary side walls 134. A plurality of pin receiving passageways 133 are formed in an engagement portion of the bottom wall 131 and the secondary side wall 134. When the upper cage 12 is engaged to the lower cage 13, the secondary side walls 134 are positioned outside the side walls 125, and both the pins 123 and the pegs 124 of the upper cage 12 pass through the pin receiving passageways 133. The pegs 124 are bent onto the outer surface of the bottom wall 131 after passing through the pin receiving passageways 133, so as to secure the upper cage 12 and the lower cage 13 together.

In an embodiment shown in FIG. 4, the connector 200 includes plug receiving units 11 arranged in an array of 2*2. As shown in FIG. 4, a partition wall 14 is provided along a substantially middle position of the cage 1 after the upper cage 12 and the lower cage 13 are engaged together, so as to divide the inner section of the cage 1 into left and right spaces. Then, the partition device 3 (described later) is mounted in the cage 1 to further divide the inner section of the cage 1 into four plug receiving units 11 (see FIG. 4).

Two rows of support member passageways 125*a* are formed in the side wall 125 and the partition wall 14 of the upper cage 12, respectively. A plurality of support members 38 are provided on both sides of the upper partition plate 31 and the lower partition plate 32, respectively. The support members 38 pass through the support member passageways 125*a* to mount the partition device 3 in the cage 1.

Figure 14:
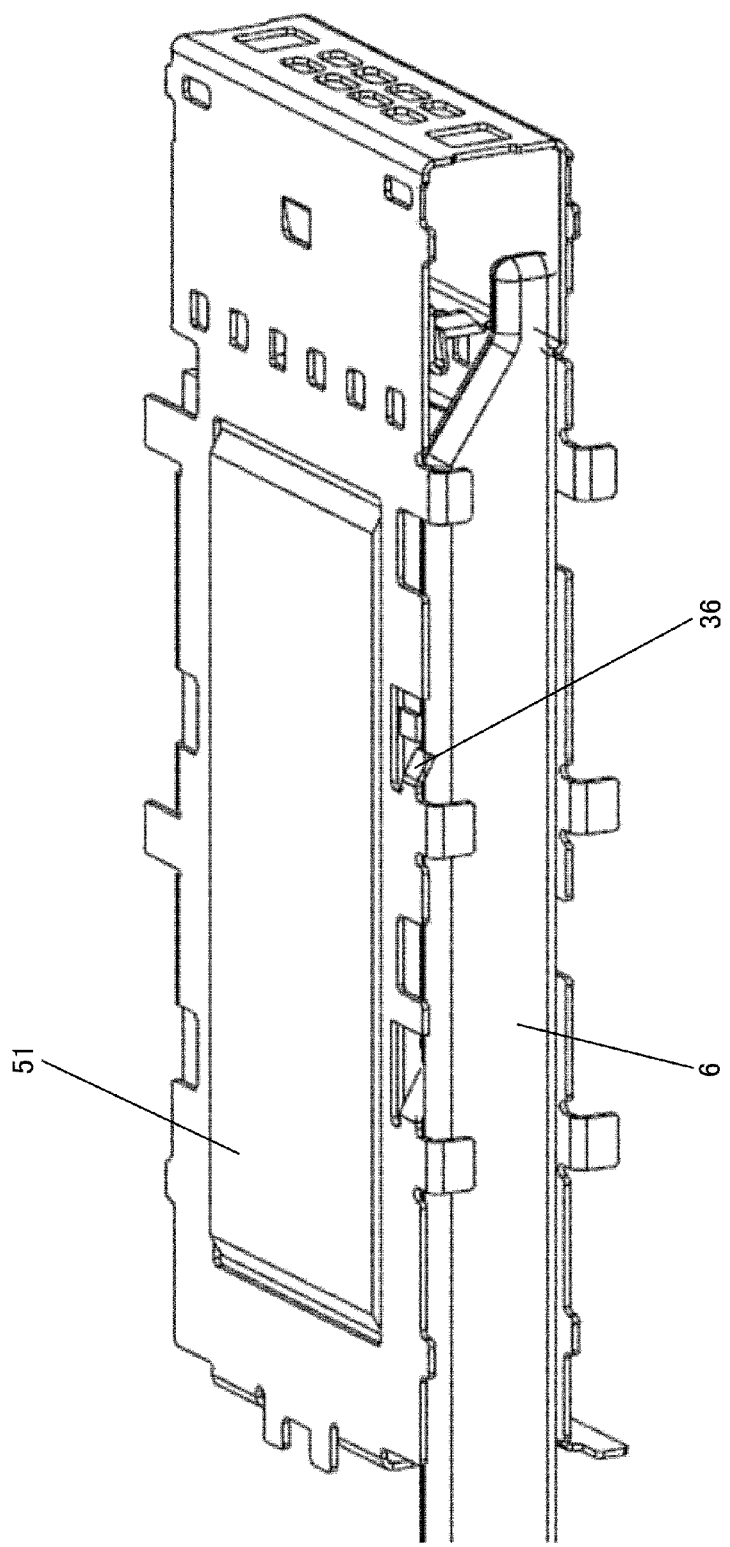
FIG. 14 is a perspective view of the partition device of the connector assembly according to the invention that is provided with a heat dissipation device and a heat conduction block.
Figure 15:
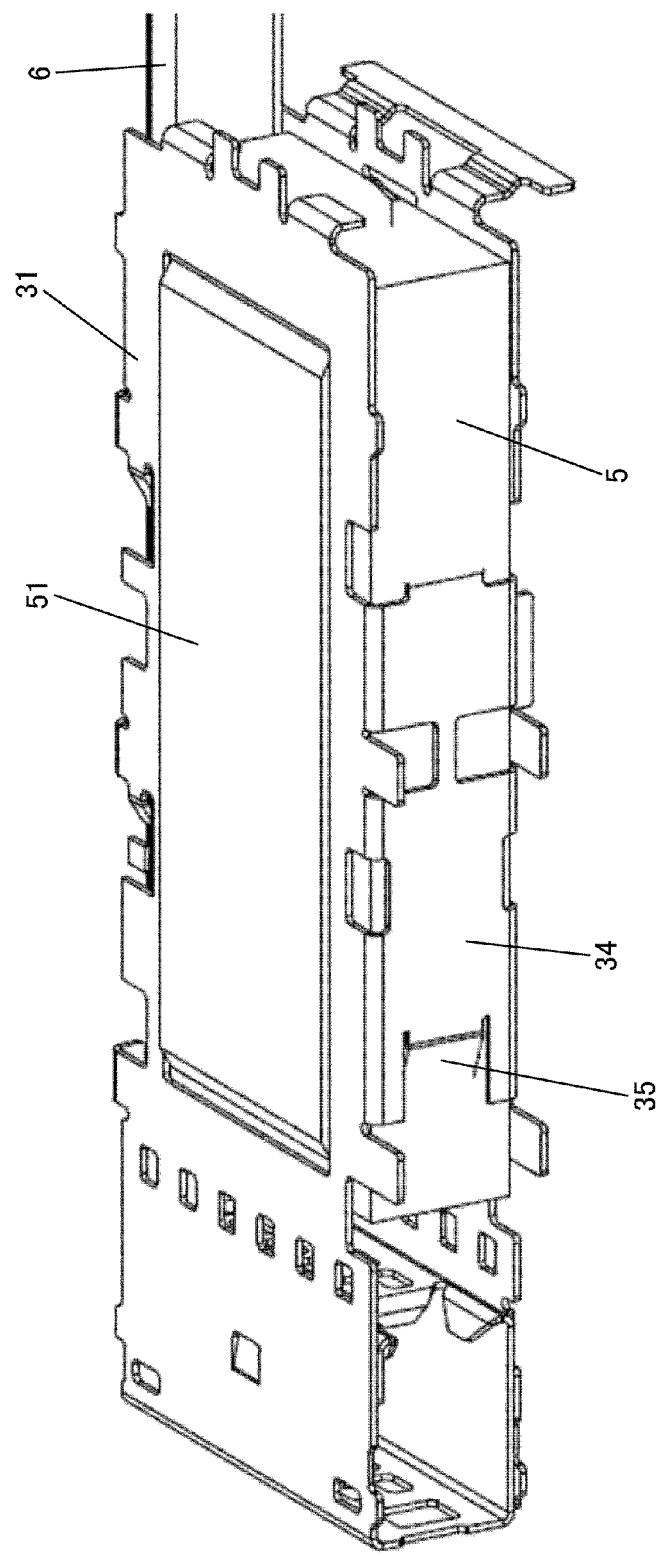
FIG. 15 is another perspective view of the partition device of the connector assembly according to the invention that is provided with the heat dissipation device and the heat conduction block.
Figure 16:
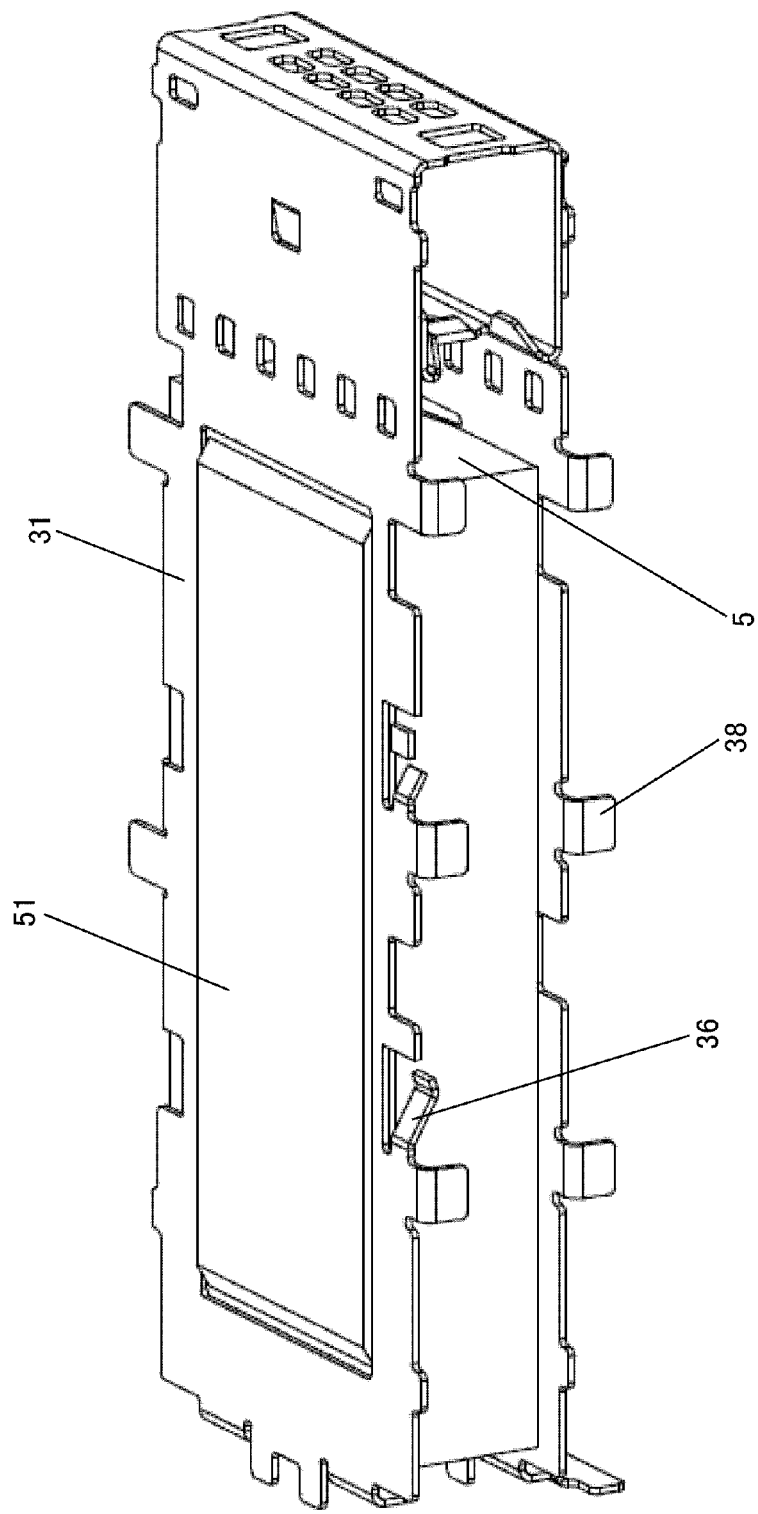
FIG. 16 is another perspective view of the partition device of the connector assembly according to the invention that is provided with only the heat conduction block.

Referring to FIGS. 3-4 and 13-16, according to an exemplary embodiment of the invention, the upper partition plate 31 and the lower partition plate 32 each is formed with a protrusion receiving passageway 33. Correspondingly, upper and lower surfaces of the heat conduction block 5 each is formed with a protrusion 51. The protrusion 51 passes through the protrusion receiving passageway 33 and extends outside the upper partition plate and the lower partition plate 31, 32, so as to directly contact the plug 10 inserted into the plug receiving units 11, and directly transfer the heat generated by the plug 10 to the heat conduction block 5. As shown in FIGS. 14-15, the heat conduction pipe 6 is configured to have a flat shaped cross section and contact a side surface of the heat conduction block 5, increasing the contact area between the heat conduction block 5 and the heat conduction pipe 6.

Figure 6:
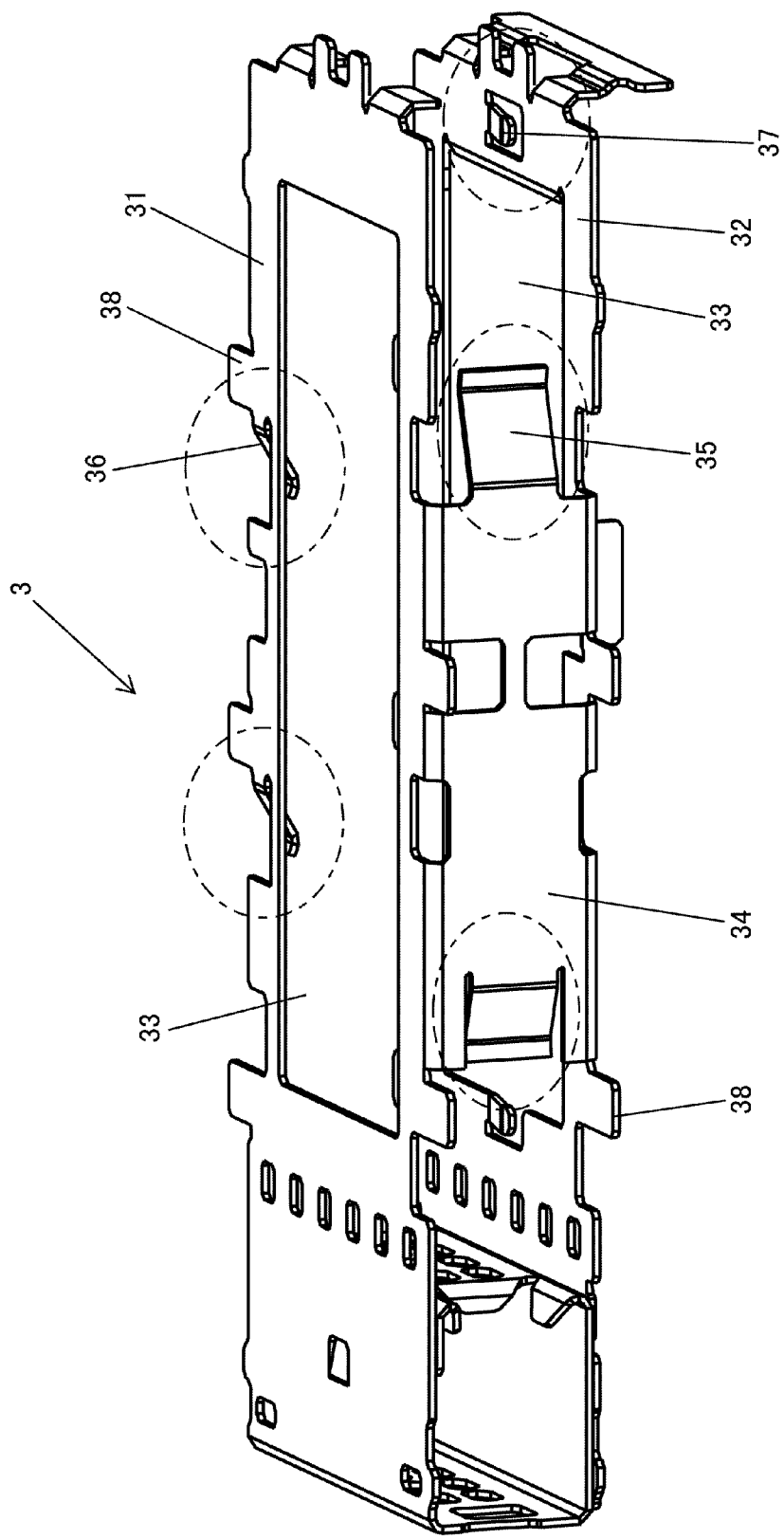
FIG. 6 is a perspective view of a partition device of the connector assembly according to the invention.
Figure 7:
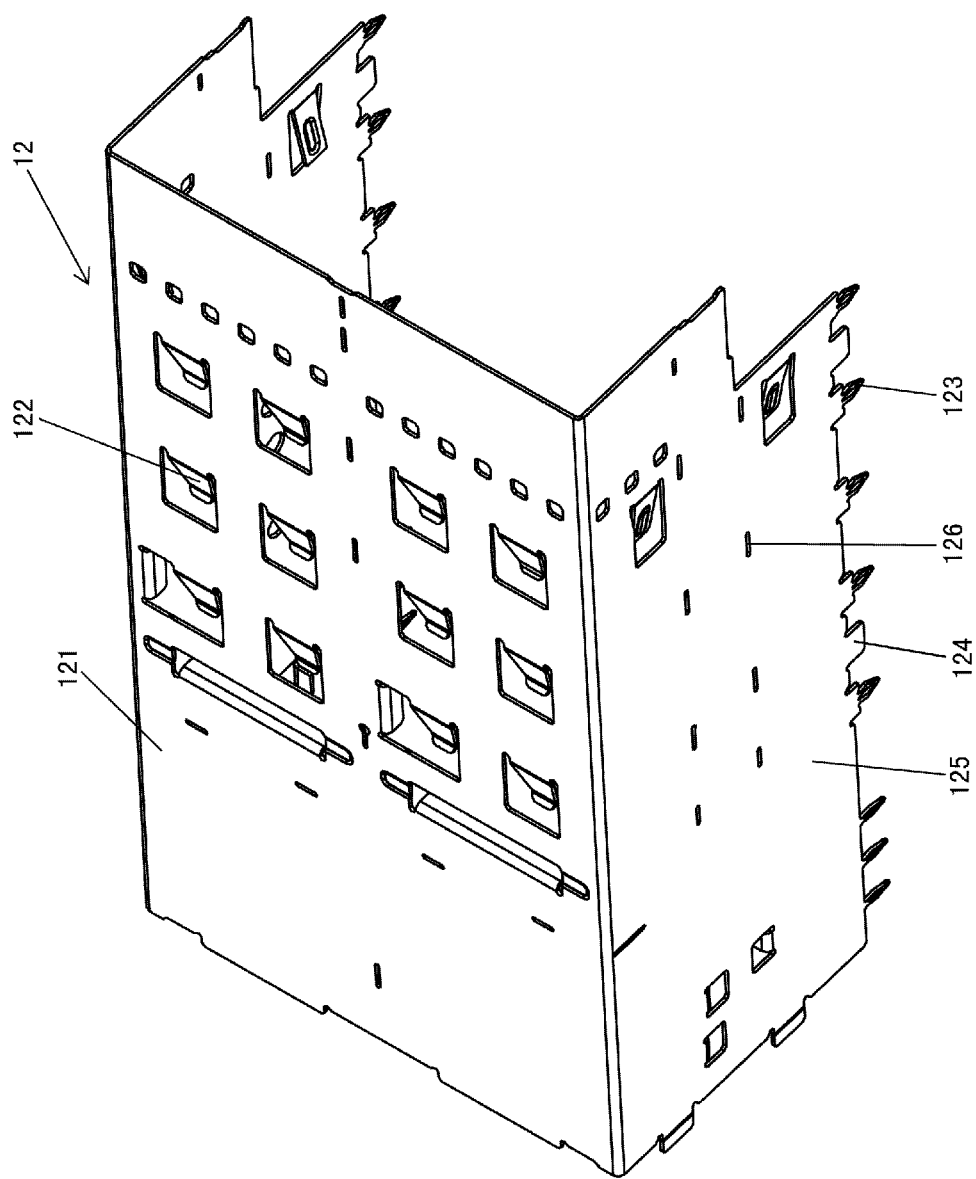
FIG. 7 is a perspective view of an upper cage of the connector assembly according to the invention.

In the connector 200 according to an embodiment of the invention, the heat dissipation device further includes a first elastic member for keeping the heat conduction block 5 to tightly come into contact with the heat conduction pipe 6. In an exemplary embodiment of the invention, as shown in FIG. 6, a connection plate 34 is provided along a first side of the upper partition plate and the lower partition plate 31, 32 in the longitudinal direction. The first elastic member is configured to be a spring 35 protruded inward from the connection plate 34. The spring 35 is configured to press the heat conduction block 5, so that the heat conduction block 5 tightly keeps contact with the heat conduction pipe 6, increasing the heat conduction efficiency there between.

As shown in FIGS. 6 and 14, at least one second elastic member 36 is provided along a second side, opposite to the first side, of at least one of the upper partition plate and the lower partition plate 31, 32 and configured to press the heat conduction pipe 6 in the up-down direction. When the heat conduction pipe 6 is inserted into the cage 1, the second elastic member 36 presses the heat conduction pipe 6 downward, so as to stably hold the heat conduction pipe 6 in the cage 1 and keep the heat conduction pipe 6 to tightly be in contact with the heat conduction block 5. It is appreciated for those skilled in this art that the second elastic member 36 may be provided on the lower partition plate 32.

Figure 8:
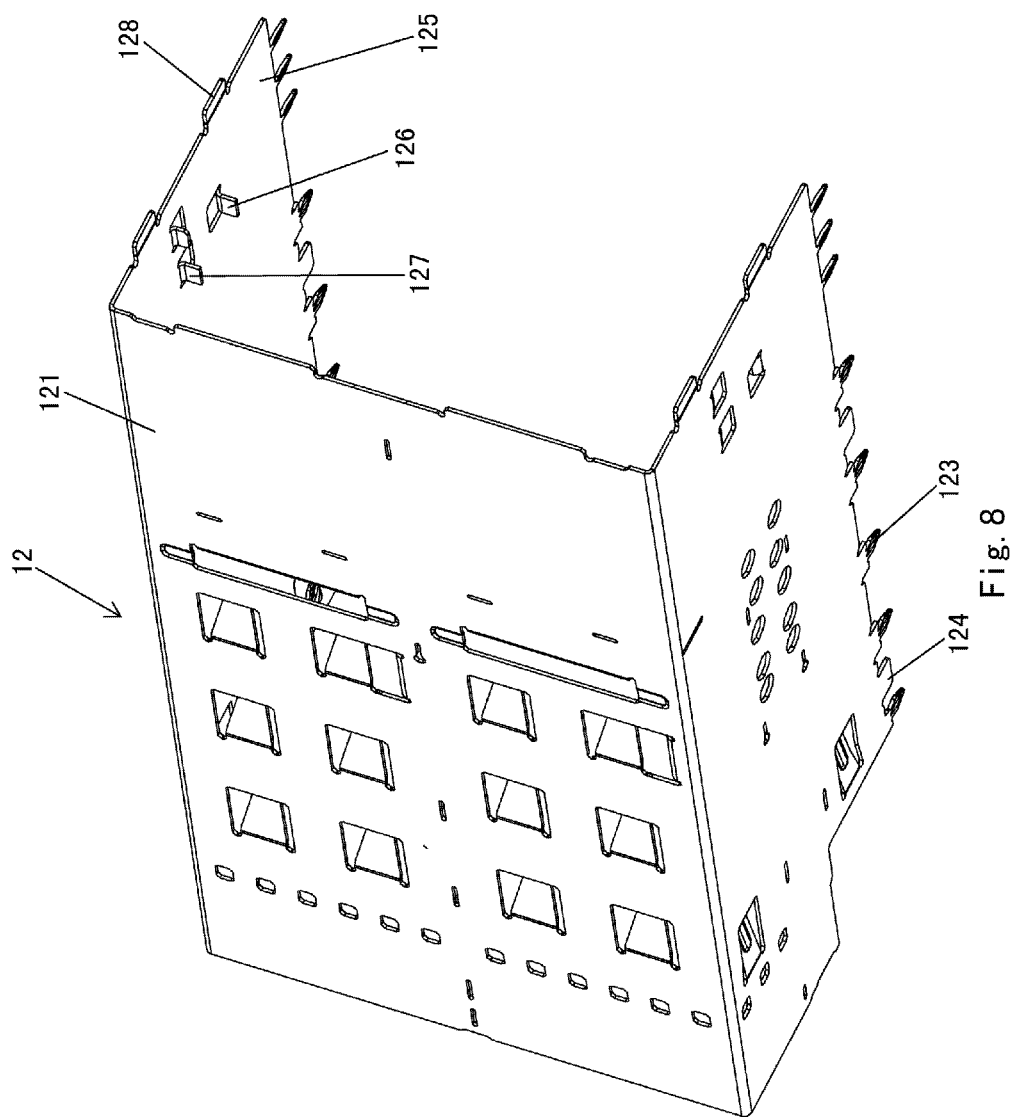
FIG. 8 is a perspective view of the upper cage of FIG. 7.
Figure 9:
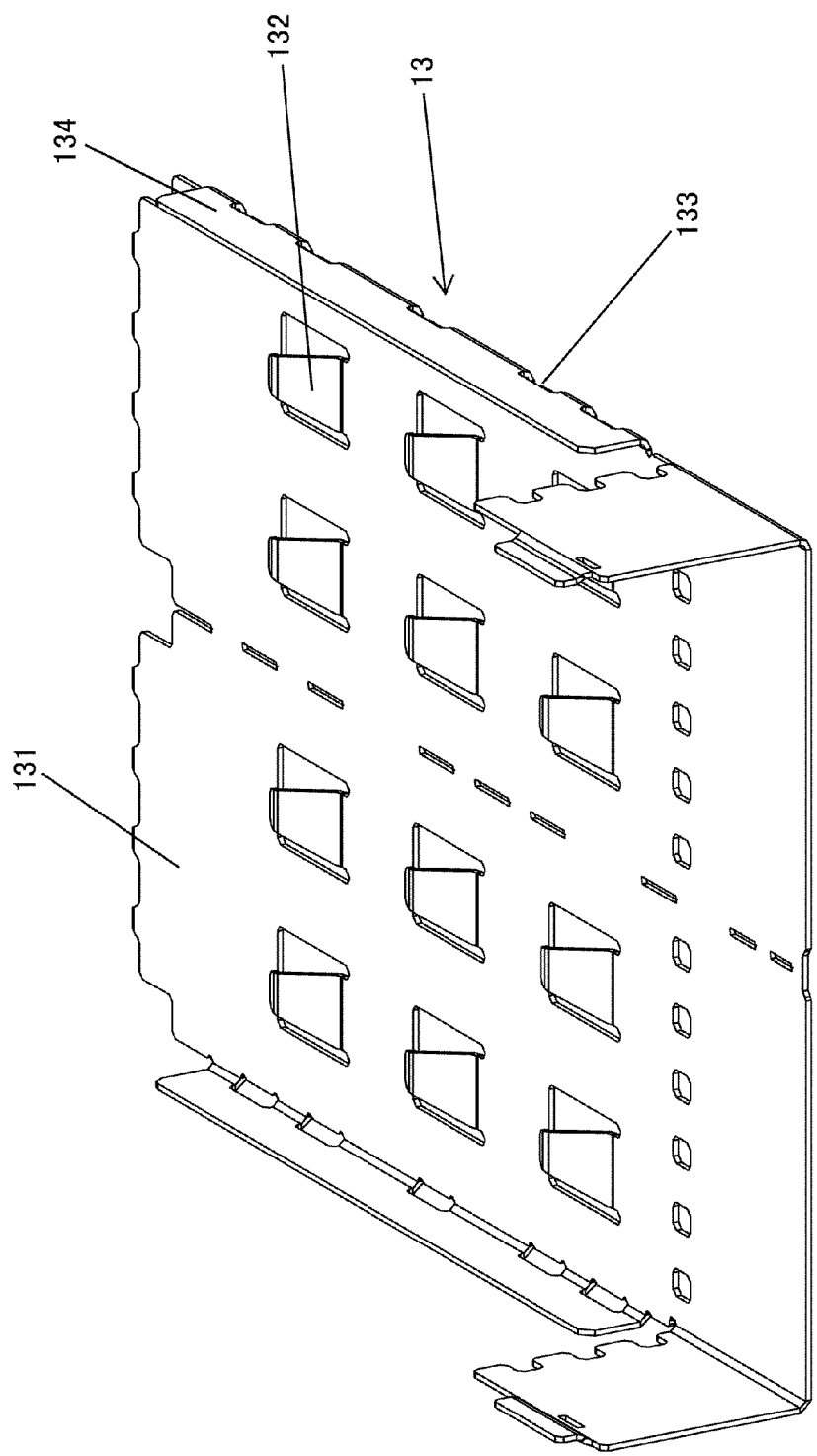
FIG. 9 is a perspective view of a lower cage of the connector assembly according to the invention.

As shown in FIGS. 4, 6 and 8, a guide device is provided on an inner side of a side wall 125 of the plug receiving units 11 adjacent to the second side. The guide device is configured to guide insertion of the heat conduction pipe 6 and position the heat conduction pipe 6 in the up-down direction. In an exemplary embodiment, the guide device includes at least one upper protrusion 127 protruded inward from the inner side of the side wall 125 and at least one lower protrusion 126 protruded inward from the inner side of the side wall 125. A vertical distance between the upper and lower protrusions 127, 126 is configured to be substantially equal to a height of the heat conduction pipe 6, so as to permit the heat conduction pipe 6 to pass there through. In this way, the guide device and the second elastic member 36 are engaged, and the heat conduction pipe 6 is stably held in the cage 1 and tightly kept in contact with the heat conduction block 5.

In an alternative embodiment, the first elastic member may be configured to be an elastic thermal pad (not shown) provided between the heat conduction block 5 and the heat conduction pipe 6. The elastic thermal pad may provide a portion of compression deformation, so as to improve the heat conduction efficiency between the heat conduction block 5 and the heat conduction pipe 6. It is appreciated for those skilled in this art that the spring 35 may be omitted in the case where the elastic thermal pad is provided.

Referring to FIG. 6 again, at least one third elastic member 37 is provided on the lower partition plate 32 and configured to press the heat conduction block 5 in the up-down direction. The third elastic member 37 is configured to be a spring protruding upward from the lower partition plate 32. When the heat conduction block 5 is mounted in the partition device 3, the protrusion 51 of the heat conduction block 5 is exposed through the protrusion receiving passageway 33, and the third elastic member 37 exerts a pressing force on the peripheral portion of the protrusion 51 of the heat conduction block 5, so as to stably hold the heat conduction block 5 in the partition device 3.

Referring to FIGS. 1-4, and 7-9, a plurality of fourth elastic members 122, 132 are provided on a top wall of the upper cage 12 and a bottom wall of the lower cage 13, respectively, so as to bias the plug 10 inserted into the plug receiving units 11 toward the heat conduction block 5. In an exemplary embodiment, the fourth elastic members 122, 132 are arranged in an array of, for example, 3 rows * 2 columns with respect to each of the plug receiving units 11. In this way, the plurality of fourth elastic members 122, 132 push the plug 10 toward the heat conduction block 5 mounted in the partition device 3, so that the heat conduction block 5 tightly keep contact with the plug 10, increasing the heat conduction efficiency between the heat conduction block 5 and the plug 10.

As shown in FIGS. 1-4 and 10, in an exemplary embodiment, the connector 200 may further include a rear cover plate 2 mounted on the rear of the cage 1. A plurality of through holes 23 are formed in the rear cover plate 2, and each of the heat conduction pipes 6 is inserted into the plug receiving units 11 through the through holes 23, so as to come into contact with the heat conduction block 5 mounted in the partition device 3. Furthermore, the rear cover plate 2 comprises a rear wall 21 and secondary side walls 22 perpendicularly extending from the rear wall 21. A plurality of through holes 26 are formed in an engagement portion of the rear wall 21 and the secondary side wall 22. Correspondingly, as shown in FIG. 8, a plurality of engagement members 128 are provided on the rear edge of the side wall 125 of the upper cage 12. When the rear cover plate 2 is mounted on the rear of the cage 1, the engagement members 128 pass through the through holes 26 and are bent inward by 90 degrees or outward by 180 degrees, so as to secure the rear cover plate 2 on the cage 1. Pins 25, for connecting to a support member, for example, a circuit board (not shown), are provided on the lower side edge of the rear wall 21.

Figure 10:
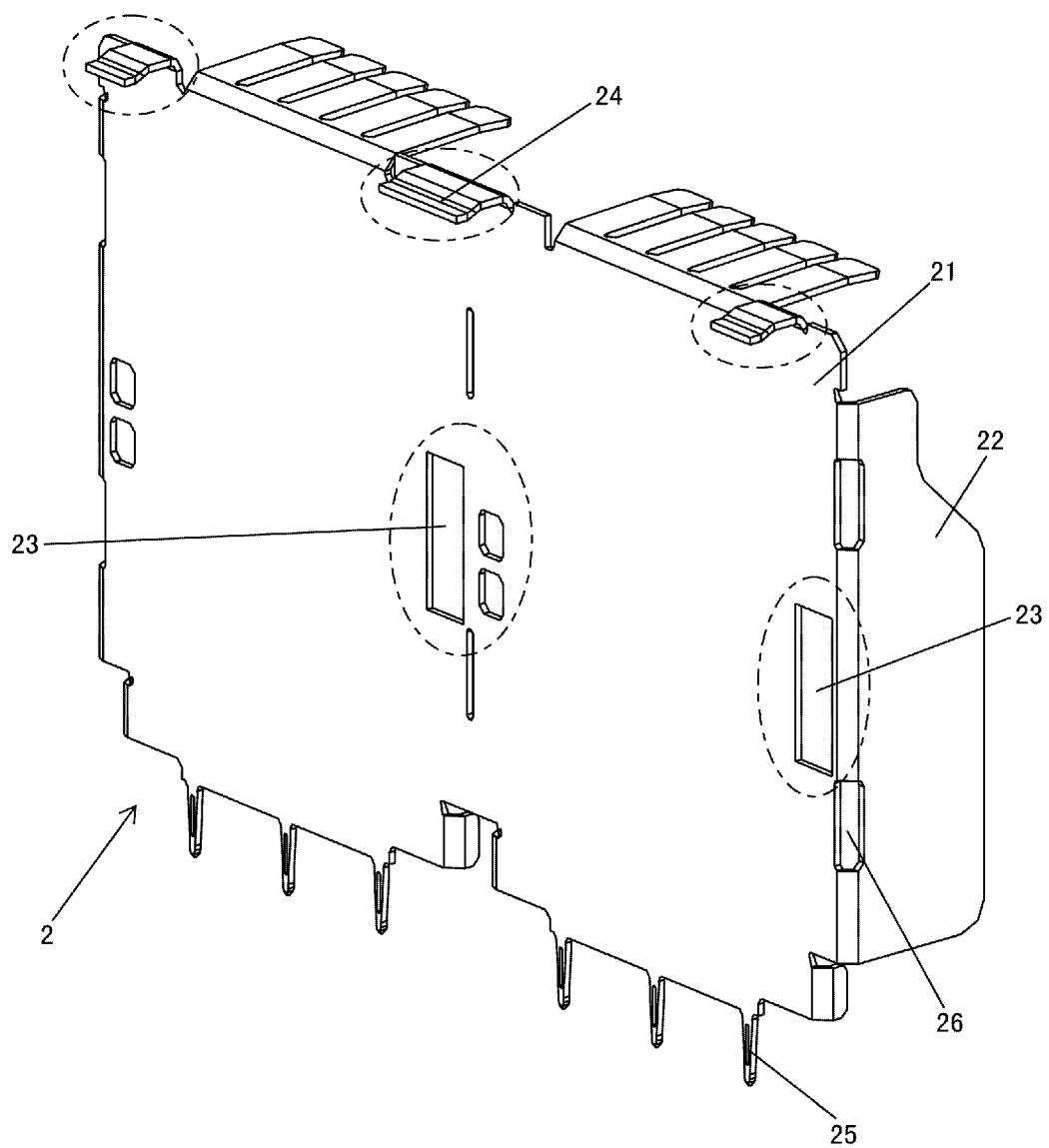
FIG. 10 is a perspective view of a rear cover plate of the connector assembly according to the invention.

In another exemplary embodiment, as shown in FIGS. 3, 10 and 11, at least one fourth elastic member 24 extending rearward is provided on the rear cover plate 2. Correspondingly, a protrusion platform 43 is formed on one of the fins 42 of the radiator 4 facing the cage 1. The fourth elastic member 24 is fitted with the protrusion platform 43 in a snap-fit manner, so as to prevent the radiator 4 from being separated from the rear of the cage 1. In an exemplary embodiment, the protrusion platform 43 is formed on the uppermost one of the fins 42. The fourth elastic member 24 is configured to be cantilevered and extend rearward from the rear wall 21 of the rear cover plate or from the top wall 121 of the upper cage 12. The fourth elastic member 24 has a bent structure at an end thereof. In this way, by pushing the radiator 4, the first arm 61 of the heat conduction pipe 6 is inserted into the cage 1 to contact the heat conduction block, and the fourth elastic member 24 with an end of bent structure being engaged with the protrusion platform 43 in the snap-fit manner, so as to stably hold the radiator 4 on the rear of the cage 1. It should be appreciated for those skilled in this art that the protrusion platform 43 may be formed any one of the fins 42 facing the cage 1. Correspondingly, the fourth elastic member 24 is configured to be a cantilevered shape, which extends rearward from the rear wall 21 of the rear cover plate 2. In this way, the fourth elastic member 24 can be engaged to the protrusion platform 43 in the snap manner.

According to an exemplary embodiment of the invention, the capillary tubes in the heat conduction pipe form a circulation circuit, and the capillary tube is filled with refrigerant. When the plug 10 generates heat in use, the heat generated by the plug 10 is transferred to the refrigerant in the capillary tubes of the heat conduction pipe via the heat conduction block. A liquid phase refrigerant in the first arm of the heat conduction pipe inside the cage absorbs the heat and is converted to a gas phase refrigerant, and the gas phase refrigerant flows into the second arm outside the cage. Since the second arm is in contact with the fins of the radiator 4, the temperature of the gas phase refrigerant is decreased, and the gas phase refrigerant is converted to the liquid phase refrigerant and flows into the first arm inside the cage. In this way, the refrigerant in the capillary tubes circulates in the circulation circuit formed by the capillary tubes and is repeatedly converted between the gas phase and the liquid phase. Thereby, the heat absorbed by refrigerant is dissipated outside by the radiator, decreasing the temperature of the plug 10.

Hereafter, a process of assembling the connector 200 according to an exemplary embodiment of the invention will be described.

Firstly, the metal heat conduction block 5 is positioned between the upper partition plate 31 and the lower partition plate 32 of the partition device 3. The partition device 3 is then mounted into the cage 1 When the whole cage is assembled, the heat conduction pipe 6 is inserted into the cage through the through hole in the rear cover plate 2. The partition device 3 is then mounted into the cage 1. Then the heat conduction pipe 6 and the fins 42 of the radiator 4 are secured by engaging the rear cover plate 2 to the fins 42.

One side of the plug 10 is pressed by the array of four elastic members composed of springs of the upper or lower cages after the plug 10 is inserted into the plug receiving units 11. Another side of the plug 10 abuts against the protrusion 51 surface of the heat conduction block 5, and the heat from the photoelectric modules in the upper and lower plug receiving units 11 is transferred to the heat conduction block 5 mounted in the partition device 3. Then, the heat is transferred to the heat conduction pipe 6 in contact with the side of the heat conduction block 5. In this way, the heat generated by the plug 10 in the plug receiving units 11 is transferred to the fins 42 of the external radiator 4 via the heat conduction pipe 6. The external fins 42 may be provided horizontally and parallel to each other, so that air flows in the left-right direction. In another embodiment, the external fins 42 may be provided vertically and parallel to each other, so that the air flows in the up-down direction. It is appreciated for those skilled in this art that, if the heat dissipation performance of the fins 42 is inadequate, it is possible to improve the entire heat dissipation performance of the radiator 4 by increasing the height of the fins 42.

In the connector 200 according to the invention, the radiator 4 is mounted on the rear of the cage. Thereby, it does not need to provide additional space for mounting the radiator 4 in the width direction, optimizing the utilization of the space for mounting the connector assembly 100. Using the heat conduction pipe 6 to transfer the heat from the inside of the cage to the outside of the cage, without a need of introducing a cool air into the cage to dissipate the heat, thereby, it satisfies a development trend of the connector 200 product with greater power and smaller volume. The heat conduction pipe 6 is bent only once and engaged to the radiator 4, improving the heat conduction performance, effectively decreasing the temperature of the plug 10, and increasing the photoelectric transformation efficiency of the photoelectric module. The connector 200 according to the invention has design flexibility without any special requirement on the top space or the bottom space. Even if the top space or the bottom space is not enough to receive the fins 42, it also can achieve effective heat dissipation.

The connector 200 and the heat conduction assembly according to above various exemplary embodiments of the invention may be applied to 2×2, 2×4, 2×6, 2×8 or 2×12 type of connector assembly 100, remarkably decreasing the temperature of the plug 10, and improve the working performance of the connector 200. In an exemplary embodiment of the invention, the connector assembly 100 may be a photoelectric conversion device, and a data communication module provided in the plug 10 may be a photoelectric chip with a photoelectric conversion function.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:
    a cage having a plurality of plug receiving units arranged in at least a two column by two row arrangement;
    a plurality of partition devices having an upper partition plate and a lower partition plate and positioned between two adjacent plug receiving units of the plurality of plug receiving units; and
    a heat dissipation device having:
        a heat conduction block positioned between the upper partition plate and the lower partition plate; and
        a heat conduction pipe contacting the heat conduction block and extending beyond a rear wall of the cage.

2. The connector according to claim 1, wherein the cage includes an upper cage and a lower cage detachably assembled with the upper cage.

3. The connector according to claim 1, wherein the heat dissipation device includes a radiator rearward mounted on the outside of the cage and connected to the heat conduction pipe.

4. The connector according to claim 3, wherein the upper partition plate and the lower partition plate include an opening.

5. The connector according to claim 4, wherein upper and lower surfaces of the heat conduction block include a protrusion that passes through the opening and extends outside the upper partition plate and the lower partition plate.

6. The connector according to claim 3, wherein the radiator includes:
    a base; and
    a plurality of fins disposed on opposite surfaces of the base and arranged parallel to each other.

7. The connector according to claim 6, wherein the heat conduction pipe is substantially L-shaped and includes a first arm inserted into the cage and contacts the heat conduction block.

8. The connector according to claim 7, wherein the heat conduction pipe further includes a second arm integrally connected to the first arm and mounted between adjacent fins of the plurality of fins.

9. The connector according to claim 8, further comprising a rear cover plate secured to the rear of the cage and having a heat conduction receiving through hole.

10. The connector according to claim 9, further comprising a fourth elastic member extending away from the rear cover plate and snap fit with a protrusion platform disposed on one of the plurality of fins.

11. The connector according to claim 10, wherein the protrusion platform is positioned on an uppermost fin of the plurality of fins.

12. The connector according to claim 1, wherein the heat conduction pipe contacts a side surface of the heat conduction block.

13. The connector according to claim 12, wherein the heat dissipation device further includes a first elastic member securing the heat conduction block in contact with the heat conduction pipe.

14. The connector according to claim 13, further comprising a connection plate positioned along a first side of the upper partition plate and the lower partition plate.

15. The connector according to claim 14, wherein the first elastic member is a spring protruding inward from the connection plate.

16. The connector according to claim 15, wherein the first elastic member is an elastic thermal pad positioned between the heat conduction block and the heat conduction pipe.

17. The connector according to claim 15, wherein the spring urges the heat conduction block to maintain contact with the heat conduction pipe.

18. The connector according to claim 17, further comprising a second elastic member positioned along a second side that is opposite to the first side along one of the upper partition plate and the lower partition plate.

19. The connector according to claim 18, wherein the second elastic member urges the heat conduction pipe upward.

20. The connector according to claim 19, further comprising a third elastic member positioned on one of the upper partition plate and the lower partition plate and urging the heat conduction block upward.

21. The connector according to claim 19, further comprising a guide device disposed along an inner side of a side wall of a receiving unit of the plurality of plug receiving units that is adjacent the second side.

22. The connector according to claim 21, wherein a plurality of fourth elastic members is disposed along a top wall of the upper cage and a bottom wall of the lower cage.

23. The connector according to claim 21, wherein the guide device includes an upper protrusion protruding inward from the inner side of the side wall.

24. The connector according to claim 23, wherein the guide device further includes a lower protrusion protruding inward from the inner side of the side wall.

25. The connector according to claim 24, wherein a vertical distance between the upper protrusion and the lower protrusion is substantially equal to a height of the heat conduction pipe.

* * * * *